US008117495B2

(12) United States Patent
Graham et al.

(10) Patent No.: US 8,117,495 B2
(45) Date of Patent: Feb. 14, 2012

(54) SYSTEMS AND METHODS OF HIGH AVAILABILITY CLUSTER ENVIRONMENT FAILOVER PROTECTION

(75) Inventors: Simon Graham, Maynard, MA (US); Dan Lussier, Holliston, MA (US)

(73) Assignee: Stratus Technologies Bermuda Ltd, Hamilton (BM)

( * ) Notice: Subject to any disclaimer, the term of this patent is extended or adjusted under 35 U.S.C. 154(b) by 587 days.

(21) Appl. No.: 11/986,792

(22) Filed: Nov. 26, 2007

(65) Prior Publication Data

US 2009/0138752 A1   May 28, 2009

(51) Int. Cl.
*G06F 11/00* (2006.01)
(52) U.S. Cl. ............... 714/11; 714/2; 714/4.11; 714/10; 714/48
(58) Field of Classification Search .................... 714/11, 714/4, 2, 4.1, 4.11, 10, 25, 48
See application file for complete search history.

(56) References Cited

U.S. PATENT DOCUMENTS

| 5,805,790 A | 9/1998 | Nota et al. | |
| 5,812,748 A | 9/1998 | Ohran et al. | |
| 6,038,684 A * | 3/2000 | Liddell et al. | 714/11 |
| 6,397,345 B1 * | 5/2002 | Edmonds et al. | 714/4 |
| 7,673,113 B2 * | 3/2010 | Sugumar et al. | 711/170 |
| 2004/0172574 A1 * | 9/2004 | Wing et al. | 714/4 |
| 2005/0289540 A1 | 12/2005 | Nguyen et al. | |
| 2006/0005231 A1 * | 1/2006 | Zuk et al. | 726/3 |
| 2006/0155883 A1 * | 7/2006 | Chou et al. | 710/3 |
| 2006/0195715 A1 * | 8/2006 | Herington | 714/4 |
| 2007/0174484 A1 | 7/2007 | Lussier et al. | |
| 2007/0174687 A1 | 7/2007 | Graham et al. | |
| 2009/0006745 A1 * | 1/2009 | Cavallo et al. | 711/114 |

FOREIGN PATENT DOCUMENTS

GB    2419703    5/2006

OTHER PUBLICATIONS

Search Report dated Jul. 10, 2009.
Written Opinion of the International Searching Authority dated Jul. 10, 2009.

* cited by examiner

*Primary Examiner* — Scott Baderman
*Assistant Examiner* — Sarai Butler
(74) *Attorney, Agent, or Firm* — K&L Gates LLP

(57) ABSTRACT

A transparent high-availability solution utilizing virtualization technology is presented. A cluster environment and management thereof is implemented through an automated installation and setup procedure resulting in a cluster acting as a single system. The cluster is setup in an isolated virtual machine on each of a number of physical nodes of the system. Customer applications are run within separate application virtual machines on one physical node at a time and are run independently and unaware of their configuration as part of a high-availability cluster. Upon detection of a failure, traffic is rerouted through a redundant node and the application virtual machines are migrated from the failing node to another node using live migration techniques.

16 Claims, 4 Drawing Sheets

SYSTEMS AND METHODS OF HIGH AVAILABILITY CLUSTER ENVIRONMENT FAILOVER PROTECTION

FIELD OF INVENTION

The present invention relates generally to computers and, more specifically, to high-availability computer systems.

BACKGROUND

Computers are used to operate critical applications for millions of people every day. These critical applications may include, for example, maintaining a fair and accurate trading environment for financial markets, monitoring and controlling air traffic, operating military systems, regulating power generation facilities and assuring the proper functioning of life-saving medical devices and machines. Because of the mission-critical nature of applications of this type, it is crucial that their host computer remain operational virtually all of the time.

Despite attempts to minimize failures in these applications, the computer systems still occasionally fail. Hardware or software glitches can retard or completely halt a computer system. When such events occur on typical home or small-office computers, there are rarely life-threatening ramifications. Such is not the case with mission-critical computer systems. Lives can depend upon the constant availability of these systems, and therefore there is very little tolerance for failure.

In an attempt to address this challenge, mission-critical systems employ redundant hardware or software to guard against catastrophic failures and provide some tolerance for unexpected faults within a computer system. As an example, when one computer fails, another computer, often identical in form and function to the first, is brought on-line to handle the mission critical application while the first is replaced or repaired.

Exemplary fault-tolerant systems are provided by Stratus Technologies International of Maynard, Mass. In particular, Stratus' ftServers provide better than 99.999% availability, being offline only two minutes per year of continuous operation, through the use of parallel hardware and software typically running in lockstep. During lockstep operation, the processing and data management activities are synchronized on multiple computer subsystems within an ftServer. Instructions that run on the processor of one computer subsystem generally execute in parallel on another processor in a second computer subsystem, with neither processor moving to the next instruction until the current instruction has been completed on both. In the event of a failure, the failed subsystem is brought offline while the remaining subsystem continues executing. The failed subsystem is then repaired or replaced, brought back online, and synchronized with the still-functioning processor. Thereafter, the two systems resume lockstep operation.

Though running computer systems in lockstep does provide an extremely high degree of reliability and fault-tolerance, it is typically expensive due to the need for specialized, high quality components, and the duplication of components, as well as the fact that the smaller number of such computer manufacturers relative to consumer quality computers prevents the economies of scale possible with consumer quality computers. Furthermore, while 99.999% availability may be necessary for truly mission critical applications, many users can operate perfectly well with a somewhat lower ratio of availability, and would happily do so if the systems could be provided at lower cost.

Virtualization technology has recently become a popular means for reducing a computer networks reliance on hardware. Since the 1960s computer systems have begun to create additional resources through the use of abstract or virtual computers. Through virtualization, several independent and isolated computing environments may be resident and run from one single hardware configuration, such as a server. The ability to create, maintain and operate countless computing environments on a single server can greatly reduce the cost of operations for any entity in which a computer network is utilized.

What is needed therefore is a cost-effective, easily-installable, fault tolerant, high-availability computer network implemented through the abstraction of computing resources.

SUMMARY OF THE INVENTION

A transparent high-availability solution utilizing virtualization technology is presented. A cluster environment and management thereof is implemented through an automated installation and setup procedure resulting in a cluster acting as a single system. The cluster is setup in an isolated virtual machine on each of a number of physical nodes of the system. Customer applications are run within separate application virtual machines on one physical node at a time and are run independently and unaware of their configuration as part of a high-availability cluster. Upon detection of a failure, traffic is rerouted through a redundant node and the application virtual machines are migrated from the failing node to another node using live migration techniques.

Embodiments of the invention include a fault tolerant system that includes a first processor system configured to run a first virtual machine and a second processor system configured to run a second virtual machine. The system further includes a private network in which the first processor system and the second processor system are in communication via the private network. A business network is provided in which the first processor system and the second processor system are in communication via the business network. A system manager is adapted to monitor the operation of the first and second processor systems and to migrate a third virtual machine from one of the first and second processing systems in response to an error alert.

The system may further include a first local disk in communication with the first processor system and a second local disk in communication with the second processor system. The local disks may also be arranged in a RAID-1 configuration. In one embodiment, the error alert is one of an actual error or a predicted error. In another embodiment, the system manager of the first processor system is moved to the second processor system in response to the error alert. The system manager may be adapted to restart one of the first and second processor systems in response to the error alert in which the restart clears the error alert. Further, in some embodiments, the error alert may be one of a loss-of-link error, a quality of service error and a business connectivity error.

Yet another embodiment of the invention includes a method of maintaining communication in a fault tolerant system that includes at least two processor systems configured to run a plurality of virtual machines and a system manager, a private network and a business network, the at least two processor systems in communication with the private network and the business network. The method includes monitoring the operation of the first and second processor systems, detecting in the system manager an error alert in one of the at least two processor systems and migrating a virtual machine from the first processing system to the second processing system in response to an error alert.

The method may further include communicating to a first local disk in communication with the first processor system and a second local disk in communication with the second processor system. The first local disk and the second local disk may be arranged in a RAID-1 configuration in one embodiment. The method may determine that the error alert is one of an actual error or a predicted error and may include moving a system manager of the first processor system to the second processor system in response to the error alert. The first processor system may be restarted in response to the error alert in which the restart clears the error alert. The fault may be one of a loss-of-link fault, a quality of service fault and a business connectivity fault.

Another embodiment of the invention includes a method of maintaining communications in a fault tolerant system having first and second redundant processor systems in which one of the redundant processor systems is executing an application. The system also includes a first network and a second network, to which the first and second redundant processor systems are connected. The method includes detecting in the first redundant processor system a fault in the first network, creating a tunnel in the second network between the first redundant processor system and the second redundant processor systems; and communicating through the tunnel to the first network via the second network and the second redundant processor system.

Further features of the embodiment may include determining that the fault is non-transient, and moving the executing application to the second redundant processor system and notifying a policy engine of the fault. In one embodiment, the fault may be one of a loss-of-link fault, a quality of service fault and a business connectivity fault and the fault may be detected by an executing thread in the first of the at least two redundant processor systems. In one embodiment, the first network includes a business network and the second network includes a private network. Additionally, the first network may include a private network and the second network may include a business network. The method may include the application being a virtual machine and the first network and second network being a fault-tolerant network.

Another embodiment of the invention includes a system including first and second redundant processor systems, in which one of the first and second redundant processor systems is executing an application. The system further includes a first network and a second network to which the first and second redundant processor systems are connected and a tunnel in the second network. The tunnel may be created upon detecting in the first redundant processor system a fault in the first network in which the first redundant processor system communicates with the first network through the tunnel. Additional features of the system may include the fault being non-transient and the executing application being moved to a second redundant processor system, a policy engine notified of the fault, the fault being one of a loss-of-link fault, a quality of service fault and a business connectivity fault.

In one embodiment, the fault is detected by an executing thread in the first of the at least two redundant processor systems. In another embodiment, the first network includes a business network and the second network includes a private network. In one embodiment, the first network may be a private network and the second network may be a business network. In one embodiment, the application may be a virtual machine and the first network and second network may include a fault-tolerant network.

In yet another embodiment, the invention relates to a method of maintaining communications to a network system. The network system may include a first redundant processor system including a first link to a first network and a second link to a second network. The system further includes a second redundant processor system including a third network link to the first network and a fourth network link to the first redundant processor system via the second network. One of the redundant processor systems executes an application. In this aspect, the method includes the steps of detecting in the first redundant processor system a fault in the first network link; creating a data path in the second network via the second and fourth network links between the first redundant processor system and the second redundant processor system; and routing communications from the first redundant processor system through the data path to the second redundant processor and the third network link to the first network.

BRIEF DESCRIPTION OF THE DRAWINGS

These embodiments and other aspects of this invention will be readily apparent from the detailed description below and the appended drawings, which are meant to illustrate and not to limit the invention, and in which.

DETAILED DESCRIPTION

The invention will be more completely understood through the following detailed description, which should be read in conjunction with the attached drawings. Detailed embodiments of the invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the invention in virtually any appropriately detailed embodiment.

Figure 1:
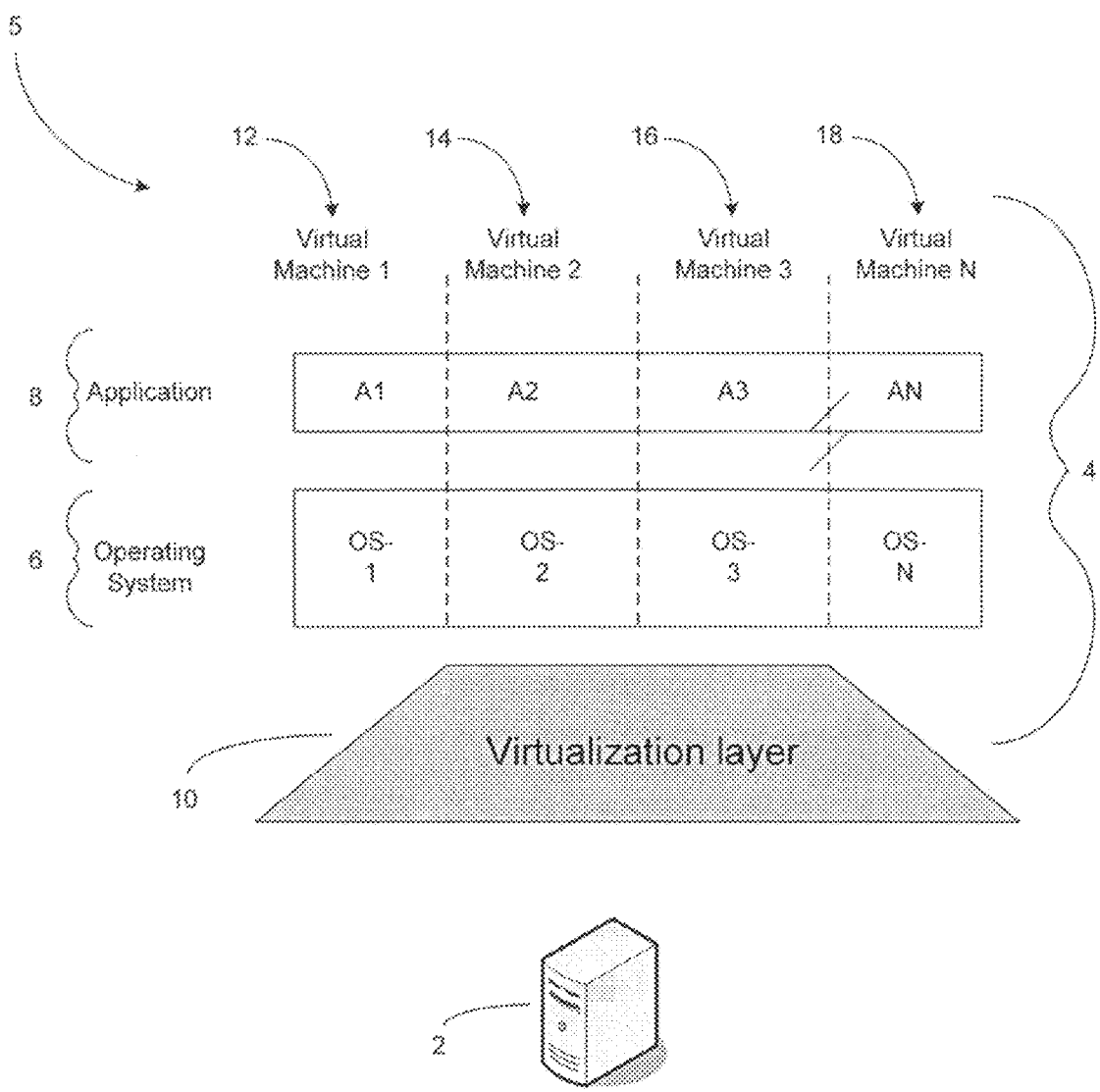
FIG. 1 is a high-level virtualization diagram in accordance with an embodiment of the present invention.

Turning now to FIG. 1, a high-level diagram of a virtualization solution 5 is presented. In one embodiment of a virtualization cluster, a server 2 is utilized to host a number of virtual machines 4. A virtual machine ("VM") 4 may be an abstract implementation of an entire operating system environment. Each VM may include its own operating system 6 in which one or more applications 8 may run. A virtualization layer 10 isolates each of the segmented VMs in such a way that each VM may run independently and unaware of any other VM. For example, (virtual machine) VM1 12 may run on operating system, OS-1 in which application A1 is executed as it would be for a traditional server. VM2 14, running OS-2 and executing A2 runs in parallel with VM1 12 as if the two VMs were located on two separate physical servers or processors. The cluster may include any number of virtual machines (shown here as VM3 16 to VMN 18). The virtualization layer 10 includes a controller (not shown) that transparently maintains and oversees the resource allocation between the VMs. The VMs, however, may operate in isolation not knowing they are part of a cluster or located on the same hardware.

Virtualization allows the network operator to reduce the costs in hardware required for a multi-faceted computer network. Often network and computing resources must be spread across a number of physical hardware servers in order to accommodate the vast amount of data processing and the burden of daily operations. Creating the number of required servers in a virtual environment allows the network operator to implement a software based solution requiring exponentially fewer resources and no specialized equipment.

Figure 2:
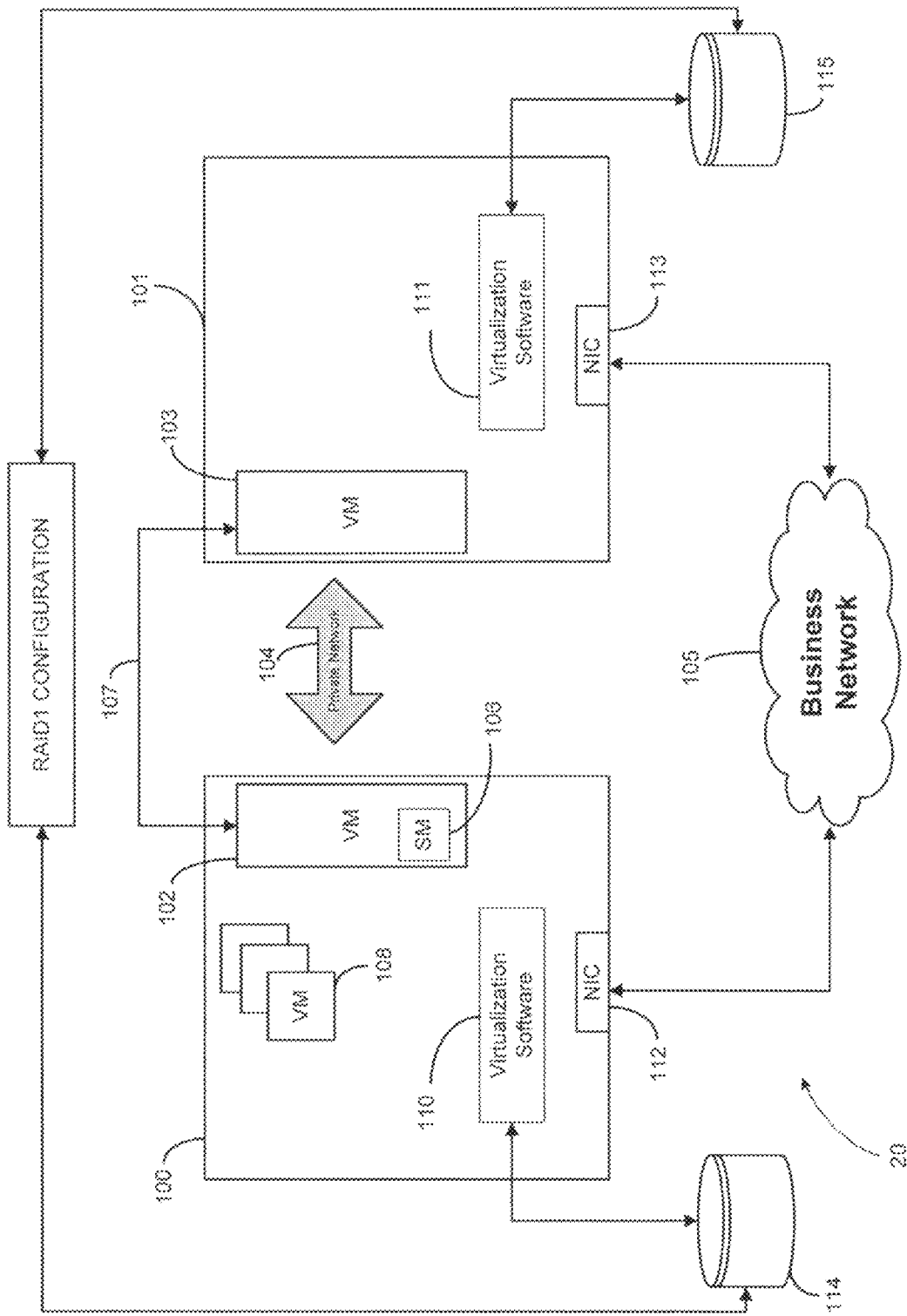
FIG. 2 is a high-level network diagram in accordance with an embodiment of the present invention.

Further, virtualization may also be implemented to create a fault tolerant, high-availability network solution that is cost effective and easily maintained. Turning now to FIG. 2, a fault tolerant system 20 in accordance with one embodiment of the invention is depicted. In one embodiment, a two-node network cluster 107 is implemented in which isolated VMs 102, 103 are setup on each of two physical nodes or processor systems 100, 101. Customer applications are resident within a series of separate application VMs 108 on one node at a time and are unaware of their arrangement within the high-availability cluster.

The first processor system 100 and the second processor system 101 each include a virtualization software module 110, 111 for controlling and managing the resources of the processor systems. In one preferred embodiment, the virtualization software is integrated with the host operating systems on each node 100, 101. In one embodiment, Xen virtualization software is implemented in the virtualization software module. The Xen software implementation may include a hypervisor that provides the local virtualization (i.e., the ability to run multiple virtual machines on one node) and a toolset that runs inside the host operating system. As shown, the toolset is part of the virtualization software modules 110, 111. The toolset provides management and live migration capability. A user managing the overall cluster would use the toolset as a mechanism to monitor the virtual machines and adjust settings in one or both nodes 100, 101 of the cluster. The fault tolerant system may also include local disk storage units 114, 115 in communication with the first and second processor systems. In one embodiment the disk storage units 114, 115 are arranged in a RAID 1 configuration.

According to the embodiment of FIG. 2, the first processor system 100 and the second processor system 101 are in communication via a private network 104 and a business network 105. In one embodiment, the private network is a dedicated link between the two nodes for data traffic between the two nodes while the business network may be linked to other networks such as a wide-area network, the internet or other third party network. The processor systems 100, 101 communicate with the business network through network interface controller (NIC) 112, 113, respectively. In various embodiments, the private network and business network 105 can be secured or unsecured.

The fault tolerant system 20 also includes a system manager 106 running within one of the isolated VMs 102, 103. Typically, the system manager 106 is only running on one node of a multi-node cluster as is shown with respect to system 100 and VM 102. The system manager 106 is resident on one of the processor systems 100, 101. In the embodiment shown in FIG. 2, the system manager is resident on the first processor system 100. The system manager 106 includes management code that is adapted to monitor the operation of the first and second processor systems 100, 101. The system manager 106 migrates the application virtual machines 108, via the underlying migration capabilities provided by the virtualization software, from one of the first and second processing system in response to an error alert or other triggering event.

In operation, one embodiment of the invention provides a two-node network, as described above, in which several application VMs are run as guest operating systems on one of the nodes. Within each of the application VMs, customer applications are run as if they were run on separate physical machines having all the resources of a traditional network-server arrangement. The customer applications may include businesses operational computing software such as databases, storage units, data processing, etc. The hardware and software resources exist in the abstract to provide a virtualized environment. The second node of the cluster runs in parallel to the first node however, without the application VMs.

The system manager 106 is located and run on one of the physical nodes monitoring the network conditions of the cluster. Upon detection of a fault on the first node, the system manager 106, having targeted the location of the fault, migrates the application VMs away from the failing node and on to the second node. The system manager 106 may utilize the virtualization software live migration techniques to transfer the application virtual machines to the second node without interrupting the processing applications. For example, in one embodiment of the invention, the system manager may be configured to receive heartbeats, quality of service or other status signals from various network resources. If one of the heartbeats terminates, or otherwise fails, the system manager may decide a loss of link failure has occurred with the business network and the first node no longer has a direct link to the business network. Further, the isolated VM 108 may continuously run an executing thread that monitors network connectivity and can detect a loss of link in a matter of milliseconds.

Upon detection of the fault, the system manager may then live-migrate the application VMs 108 over the private network 104 (or other network) and onto the second node. The applications running within the application VMs continue to execute and run while remaining oblivious to the fault or the migration occurring around them. The system manager 106 is also migrated to the second node (to the isolated VM 103) and operations continue with no downtime for the customer applications. The system, in one embodiment utilizes a single IP address configuration in which only the node on which the application VMs are running possesses the active address. The IP address, upon detection of a fault, is migrated along with the application VMs to the second node such that a single IP address is active on only one node at a time.

One such virtualization management system capable of live migration is Xen™, a software project managed by Citrix of Fort Lauderdale, Fla. The Xen™ applications provide a software virtual machine monitor for various computer architectures. The software runs on a host operating system and allows several guest operating systems to run within the host operating system on the same computer hardware at the same time. Thus, Xen™ allows the guests to run as individual instances that are migrateable. Although Xen™ is designed as a virtualization software it is not designed for fault tolerant operation. The techniques described herein allow virtualization software, hardware and methods, such as that offered by Citrix, to create less expensive fault tolerant clusters, relative to several existing hardware implementations.

Once the application VMs have been migrated from the failing node, the system manager 106 may shutdown, restart or otherwise repair the failing node in an effort to fix the failure. The application VMs may continue to reside and run on the second node when the first node comes online again. Here, the first node has now become the backup node in the high-availability system.

In one embodiment of the invention, a web-based management portal is implemented providing an administrator, automated policy engine or other automated process, control of the application VMs without regard of the location from which the VMs are running. The web-based portal also provides for control of the physical resources on all nodes in the cluster as if they were components within a single system.

The web based management portal allows for easy maintenance and installation of the fault tolerant system. A system administrator or other qualified supervisor may monitor and control the network environment through the portal from a monitor and control station. The system may detect a fault and notify the supervisor of the fault via email, text message, a pop-up window, alarm etc. The supervisor may then take the appropriate action in curing the default, migrating the application VMs to the second node, if necessary. Once the VMs have been migrated, without losing any process time, the supervisor may take appropriate action to remedy the fault, either by selectively repairing the resource that created the fault, or by a system restart on the failed node.

Alternatively, the monitor and control of the fault tolerant system may be automated through the use of a policy, or rules based engine in the control manager. If a fault is detected in the network on the first node, for example, the policy engine may determine the severity and immediacy of the fault and proceed with appropriate remedial actions based upon a predefined scenario. The fault may require the policy engine to initiate the live migration of the VMs to the second node in order to maintain network connectivity. Once the policy manager is satisfied that the application VMs are located on the proper resource, it may instruct the control manager to repair the fault by restarting the failed node. The use of the web-based management portal, either by manual operation or through the use of a rules-based policy engine, in a virtualized environment creates an easily and efficiently maintainable fault-tolerant, high-availability system.

While embodiments of the invention described above discuss network faults in the context of a failed heartbeat or other notification of a network resource fault, embodiments of the present invention utilize statistical and analytical metrics to predict future faults within the network. An error logging function in one embodiment is implemented to track and store network faults. The system manager analyzes real-time network usage metrics and statistics to predict an upcoming fault based on prior faults detected in the system. The network usage metrics may include, but are not limited to, operating temperatures, voltages, memory errors, dropped packets, etc.

For example, if a particular NIC has historically failed after a given amount of up-time, or after the system reaches a certain temperature, the system manager may predict the probability of the fault occurring after a period of time or after some other triggering event. In such a case, the system manager may preemptively address the fault, by migrating the application VMs to the second node prior to the fault occurring. If the fault does occur, the system manager handles the fault as described above.

While embodiments of the invention have been described herein with reference to a network failure or NIC failure, one skilled in the art should recognize that any network resource error, such as a loss-of-link error, a quality of service error or a business connectivity error may be detected without deviating from the scope of the invention. Quality of service error may include, but are not limited to, a drop in data transfer rate, a threshold number of dropped packets, loss of bandwidth, loss of encryption, or others Turning now to FIG. 3, a more detailed view of the embodiment of FIG. 2 is shown in which an event 125 (such as an error, failure, or other status change in the system) has occurred. An embodiment of the invention provides for a system of maintaining network connectivity upon detection of an event, such as a loss of link, hardware failure or other fault by implementing a tunnel 120, or dedicated data path, through the remaining operable network interlinks. Tunnel, as used herein, refers to any data path, channel, or circuit, whether tangible or abstract, through which data may pass between two nodes, two processors, or two resources. For example, if the system manager detects a loss of link in the NIC 112 on the first node 100 which effectively closes off communication front the first node 100 to the business network 105, a tunnel 120 is created through the link in the private network 104. The system manager 106 routes any data traffic to and from the first node 100 through the tunnel 120 to the second node 101 and to the business network 105 via the second node's NIC 113. Any returning traffic to the first node 100 may also be routed through the second node 101 and back to the first node 100 via the tunnel 120. Further, if the private network fails, the tunnel can be routed through the business network 105 to connect the two nodes in the cluster. Routing through the business network 105 is usually performed through an encrypted channel.

Creating the tunnel 120 and re-routing the data traffic through the second node 101 provides a short-term remedy to the loss of connectivity in a minimal amount of time. The only significant outage period in the network occurs between the actual loss of connectivity and the detection of the fault by the system manager 106. In many cases, this outage period may be minimized to a matter of hundreds of milliseconds (ms) depending on polling or heartbeat functions of the system manager 106. In one embodiment, a continuously running thread within the isolated VM 108 can detect loss of network connectivity within a few milliseconds. The thread can discover and verify the connectivity between any of the physical hardware resources on the network while remaining transparent to the application VMs.

Once the fault is detected, traffic is re-routed immediately through the tunnel with no downtime. Following establishment of the tunnel, link level broadcast messages are sent using the MAC address of the application virtual machines to cause forwarding tables in external switches to be updated such that packets destined for the application virtual machines are forwarded to the NIC 113 on the second processor system 101. In one embodiment a level-2 (data link layer) network bridge runs within the virtualization software modules 110, 111 on each of the two processor systems 100, 101. The bridge is used to route traffic between the application VMs 108 and the external network 105. When the bridge detects traffic destined for the failed resource, it is redirected to the port through which the tunnel has been created.

Figure 3:
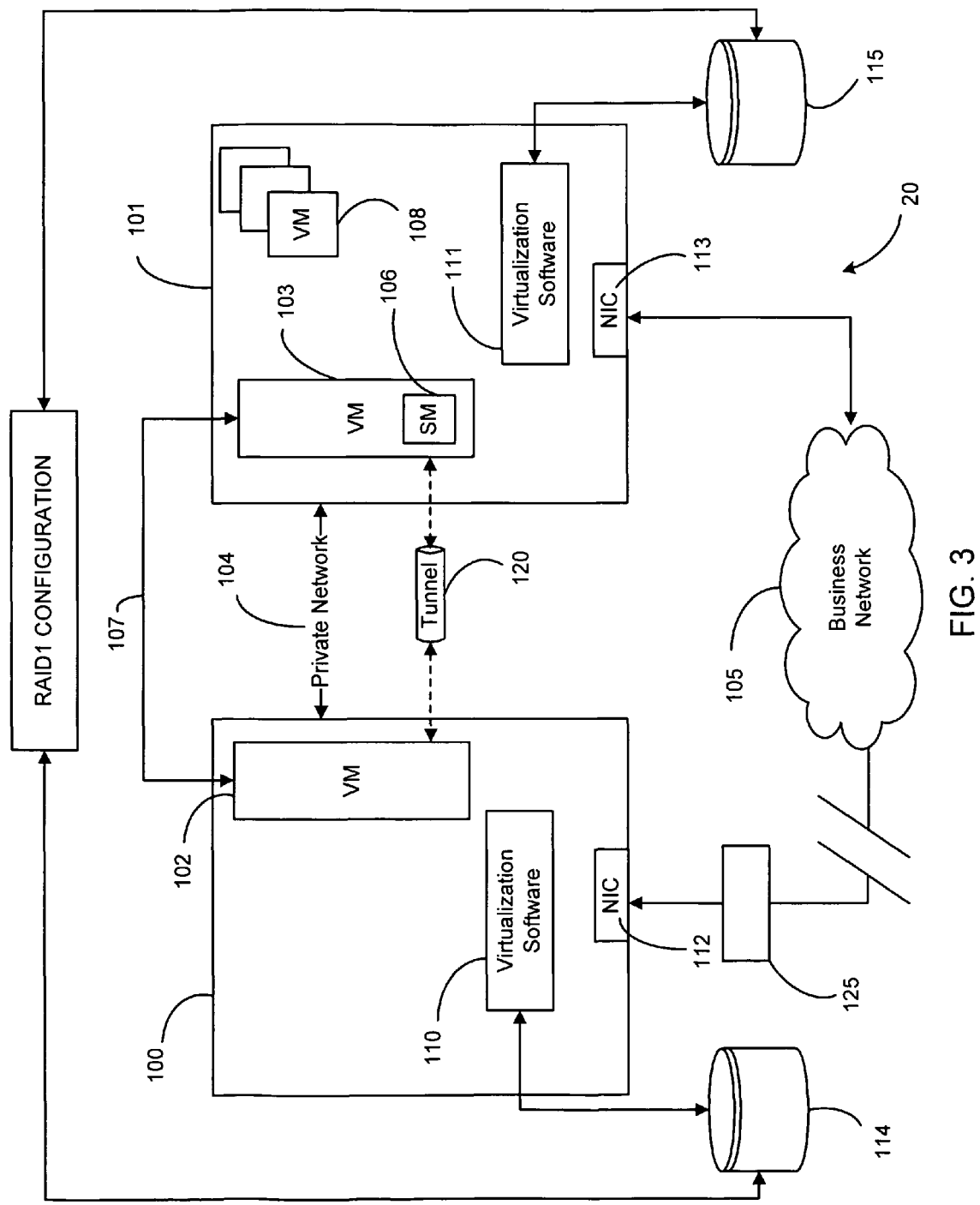
FIG. 3 is a high-level network diagram depicting, in part, management of an error event in accordance with an embodiment of the present invention.

Once the short-term remedy is established, the rerouting addresses have been established, and the first node is isolated from the business network, the system manager may then investigate the status of the first node and determine a longer term fix that will return redundancy to the system. The first step in the long term solution is to migrate the application VMs from the isolated first node to the fully operative and connected second node. As seen in FIG. 3, the system manager 106 has been migrated to the virtualization software module 111 on the second processor system 101. As described above, this may be executed using live-migration techniques in which neither the application VMs, nor the customer applications within the applications VMs are running are aware of the fault or migration.

A rules based policy engine is used, in one embodiment, to determine the severity of the fault and the proper course of action. The system manager collects all the data surrounding the fault and submits it to the policy engine. If the loss of connectivity is the result of a temporary outage, a restart to the resource, or entire node, may be executed to bring the first node back online. If the loss is due to a hardware failure or other failure that may not be easily remedied, the system manager may notify an administrator or other supervisory user of the fault. The administrator may then take the proper course of action to replace the hardware or provide some other permanent fix. Once the long-term remedy has been completed, the system may be restarted and the connectivity to the business network will be established. The network connection may then be reestablished directly through the NIC of the first node 100 to the business network 105. The first node 100 then becomes the back-up node until the second node 101 detects a similar fault.

While the embodiments described above discuss an illustrative system in which the loss of the network connectivity occurs in the NIC connecting the node to the business network, one skilled in the art should recognize that the loss of connectivity anywhere in the system may be remedied through similar steps. For example, if the crosslink connection of the private network 104 were to fail, a tunnel may be implemented through the business network. In such an implementation, the data may be compressed and encrypted prior to sending through the business network, which in some embodiments may include the Internet.

Further, while the embodiments described above relate to a NIC failure or a loss of network connectivity, one skilled in the art should recognize that any other resource failure may be detected and cured in line with the methods and systems described. For example, a fault may include, without limitation, a decrease in data flow rate, dropped packets, or other quality-of-service fault or deficiency.

Figure 4:
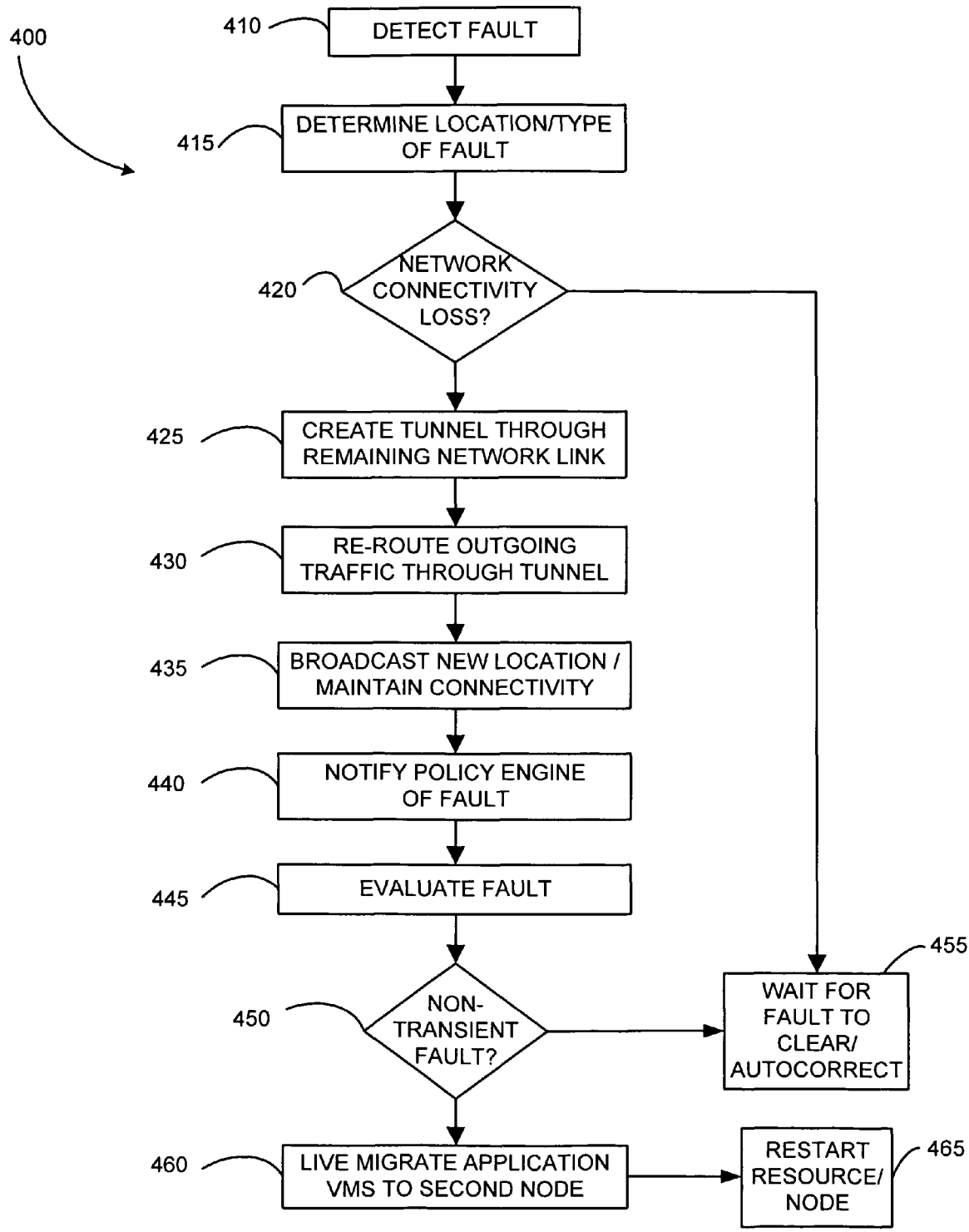
FIG. 4 is a flow diagram of some of the steps of an illustrative method in accordance with an embodiment of the present invention.

Turning now to FIG. 4, an illustrative method 400 in accordance with an embodiment of the invention is depicted In one embodiment of the invention, a redundant, fault-tolerant, highly-available system is implemented in which a fault is detected 410 by a system manager running on a first node of the system. In one embodiment, the system includes at least two nodes linked by at least a business network and a private network. The fault may include, but is not limited to a loss of network connectivity, hardware failure, software failure, decrease in quality of service, etc. The fault may be detected using fault detection methodologies known in the art or, in one embodiment by a continuously executed thread running in an isolated VM on the first node. The system manager may determine the location and severity of the fault 415.

If a loss in network connectivity 420 is found between the first node and the business network, for example, a tunnel is created 425 in a crosslink of the private network to the second node. The system manager then re-routes the outgoing traffic 430 from the first node through the tunnel to the second node and out to the business network.

In order for any entity in communication with the first node to return data to the node, the system manager must broadcast 435 the change in location of the node, thereby instructing any entity to forward subsequent data traffic to the new data path through the second node. Once connectivity through the tunnel is established with no significant downtime, a short term repair, the system manager may notify 440 a rules-based policy engine of the network failure and forwards all relevant data concerning the failure to the engine for processing. The policy engine may then evaluate 445 the fault and relevant data in order to determine the proper course of action. If the policy engine determines the fault is not a transient fault 450 (i.e. a fault that will correct itself or is otherwise temporary 455), the system manager may migrate the application VMs across the crosslink of the private network utilizing live-migration techniques 460. Once the application VMs have been evacuated the first node may be repaired, either by restarting the physical resources 465, replacement of hardware, software patches, or any other remedy required. With the fault repaired, the first node may be brought back online where it will serve as the back-up to the second node until the second node detects a similar fault.

While the invention has been described with reference to illustrative embodiments, it will be understood by those skilled in the art that various other changes, omissions and/or additions may be made and substantial equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A method of maintaining communications in a fault tolerant computer system comprising: first and second redundant processor systems, one of the redundant processor systems executing a virtual machine; and a first network and a second network, to which the first and second redundant processor systems are connected; the method comprising:
   detecting in the first redundant processor system a fault in the first network;
   creating a tunnel in the second network between the first redundant processor system and the second redundant processor systems;
   communicating through the tunnel to the first network via the second network and the second redundant processor system;
   determining that the fault is non-transient; and
   migrating the virtual machine from the first redundant processor system to the second redundant processor system through the tunnel in response to the fault in the first network.

2. The method of claim 1 further comprising notifying a policy engine of the fault.

3. The method of claim 1 wherein the fault is one of a loss-of-link fault, a quality of service fault and a business connectivity fault.

4. The method of claim 1 wherein the fault is detected by an executing thread in the first of the at least two redundant processor systems.

5. The method of claim 1 wherein the first network comprises a business network and the second network comprises a private network.

6. The method of claim 1 wherein the first network comprises a private network and the second network comprises a business network.

7. The method of claim 1 wherein the first network and second network comprise a fault-tolerant network.

8. A fault tolerant computer system comprising:
first and second redundant processor systems, one of the first and second redundant processor systems executing a virtual machine;
a first network and a second network to which the first and second redundant processor systems are connected;
a tunnel in the second network, the tunnel created upon detecting in the first redundant processor system a fault in the first network, the first redundant processor system communicating with the first network through the tunnel; and
migrating the virtual machine from the first redundant processor system to the second redundant processor system using the tunnel, in response to the fault in the first network.

9. The system of claim 8 wherein the fault is non-transient and the executing virtual machine is moved to the second redundant processor system.

10. The system of claim 8 further comprising a policy engine, the policy engine notified of the fault.

11. The system of claim 8 wherein the fault is one of a loss-of-link fault, a quality of service fault and a business connectivity fault.

12. The system of claim 8 wherein the fault is detected by an executing thread in the first of the at least two redundant processor systems.

13. The system of claim 8 wherein the first network comprises a business network and the second network comprises a private network.

14. The system of claim 8 wherein the first network comprises a private network and the second network comprises a business network.

15. The system of claim 8 wherein the first network and second network comprise a fault-tolerant network.

16. A method of maintaining communications to a network system comprising: a first redundant processor system including a first link to a first network and a second link to a second network; and a second redundant processor system including a third network link to the first network and a fourth network link to the first redundant processor system via the second network, one of the redundant processor systems executing a virtual machine; the method comprising:
detecting in the first redundant processor system a fault in the first network link;
creating a data path in the second network via the second and fourth network links between the first redundant processor system and the second redundant processor system;
routing communications from the first redundant processor system through the data path to the second redundant processor and the third network link to the first network; and
migrating the virtual machine from the first redundant processor system to the second redundant processor system using the data path, in response to the fault in the first network link.

* * * * *